UNITED STATES PATENT OFFICE.

ENRICO LANGEN, OF HANOVER, PRUSSIA, GERMANY.

SUBSTITUTE FOR CORK.

SPECIFICATION forming part of Letters Patent No. 395,241, dated December 25, 1888.

Application filed July 20, 1888. Serial No. 280,541. (No specimens.) Patented in Germany February 20, 1887, No. 40,643, and December 1, 1887, No. 43,906.

*To all whom it may concern:*

Be it known that I, ENRICO LANGEN, a subject of the Grand Duke of Hesse, residing at Hanover, in the Kingdom of Prussia, German Empire, have invented a new and useful Composition of Matter to Form a Substitute for Cork, (for which I have obtained Letters Patent of Germany, No. 40,643, dated February 20, 1887, and No. 43,906, dated December 1, 1887,) of which the following is a specification.

The object of this invention is to produce from the pith of the stalks of maize and other similar plants a substance of low specific gravity suitable for use as a substitute for cork.

I prepare the new substance in the following manner: About three kilos of granulated pith (granulated to the size of about three millimeters per granule) are intimately mixed in the presence of intense heat with hot paste or adhesive material. A suitable paste is prepared by mixing about three kilos of starch with about twenty-seven kilos of water. This mixture of pith and adhesive material is placed in molds and immediately dried by exposing the mixture to a temperature of about from 100° to 110° centigrade. After being dried the mass is suited to replace natural cork to a very considerable extent. It is preferable to cork or cork-like substances hitherto made, on account of its very low specific gravity, non-conductibility of heat, and extreme cheapness, as the material from which this new cork-like mass is produced could heretofore be used only for fuel. The above-mentioned proportions have proved to be the best in practice; but they may be varied without departing from the invention.

The prepared mass may be introduced into commerce in the form of molded blocks or pieces or be ground to powder or granulated or prepared according to its intended use.

The above-named starch-paste used for producing the new mass may be replaced by any other suitable adhesive material.

This cork-like substance is easily made elastic by adding thereto before molding a certain quantity of linseed-oil or tar. The mass will then remain elastic even after drying.

In addition to these numerous advantages the mass can also be made fire-proof by adding to the mixture of pith and paste before drying a fireproofing substance—such as water-glass or tungstate of soda dissolved in a suitable solvent—such as water—or a fire-proof mineral—such as infusorial earth, light clay, or the like. The dried mass is then completely fire-proof, and may be used in various manners, owing to its low specific gravity.

Having now particularly described the nature of the said invention and in what manner the same is to be carried out, I declare that what I claim is—

1. A composition of matter to form a substitute for cork, consisting of powdered pith of stalks—such as maize-stalks—an adhesive material—such as starch-paste—and a substance—such as linseed-oil—to render the mass elastic, substantially as described.

2. A composition of matter to form a substitute for cork, consisting of powdered pith of stalks—such as maize-stalks—an adhesive material—such as starch-paste—a fire-proof material—such as water-glass—and a substance—such as linseed-oil—to render the mass elastic, substantially as described.

In testimony whereof I have signed my name to this specification in the presence of two subscribing witnesses.

ENRICO LANGEN.

Witnesses:
G. HIELSMANN,
B. ROI.